United States Patent [19]

Hara

[11] Patent Number: 5,008,219

[45] Date of Patent: Apr. 16, 1991

[54] PROCESS FOR PRODUCING GLASS

[75] Inventor: Koichi A. Hara, Ome, Japan

[73] Assignee: Hoya Corporation, Tokyo, Japan

[21] Appl. No.: 448,283

[22] Filed: Dec. 11, 1989

[30] Foreign Application Priority Data

Dec. 26, 1988 [JP] Japan ................................ 63-326365

[51] Int. Cl.$^5$ .............................................. C03C 3/04
[52] U.S. Cl. ........................................ 501/12; 65/901
[58] Field of Search ............................ 501/12; 65/901

[56] References Cited

U.S. PATENT DOCUMENTS 4,681,615 7/1987 Toki et al. ............................ 65/18.1

FOREIGN PATENT DOCUMENTS 9102833A 6/1984 Japan ..................................... 501/12

Primary Examiner—Mark L. Bell
Assistant Examiner—Deborah Jones
Attorney, Agent, or Firm—Nixon & Vanderhye

[57] ABSTRACT

The present invention relates to a sol-gel glass producing process which comprises hydrolyzing a metal alkoxide in the presence of an organic solvent and an aqueous ammonia solution to obtain a sol solution, concentrating the sol solution to 1.00–1.95 times the volume of the metal alkoxide used, adding an acid catalyst to the resulting concentrate to allow the concentrate to gel, drying the resulting gel, and heating the dried gel to obtain a desired glass.

According to the present invention, a large sized glass can be obtained without the formation of cracks.

4 Claims, No Drawings

PROCESS FOR PRODUCING GLASS

BACKGROUND OF THE INVENTION (1) Field of the Invention

The present invention relates to a process for producing a glass and particularly to a process for producing a glass, wherein a large-sized glass can be produced efficiently according to a sol-gel process without requiring a complex procedure.

(2) Description of the Prior Art

The processes for glass production include the so-called sol-gel process using a metal alkoxide. This sol-gel process for glass production has been considered to be unsuitable for production of a large-sized glass, because in the process the dried gel obtained by the drying treatment after gelation tends to have cracks.

Meanwhile, Japanese Patent Application Kokai (Laid-Open) No. 131833/1985 discloses a sol-gel process for producing a large-sized glass which had been impossible to obtain according to the prior sol-gel process. As is clear from the description made in Examples of said patent document, the process comprises mixing a metal alkoxide (e.g. silicon ethoxide) with an acid (e.g. hydrochloric acid); vigorously stirring the mixture; adding an ultrafine silica powder thereto with stirring; applying an ultrasonic vibration thereto; removing the resulting clusters by centrifugation; adjusting the pH of the obtained solution with a basic catalyst; and then effecting gelation, drying and heating in this order. The process, however, has problems in that not only the steps are complex but also the clusters are present even after the ultrasonic vibration and need be removed by centrifugation.

Thus, the process disclosed in Japanese Patent Application Kokai (Laid-Open) No. 131833/1985 can produce a relatively large-sized glass according to a sol-gel process, but uses very complex steps and requires, for example, ultrafine silica powder addition, ultrasonic vibration and centrifugation.

SUMMARY OF THE INVENTION

Therefore, the object of the present invention is to provide a process for producing a glass, wherein a large-sized glass can be produced efficiently according to a sol-gel process without requiring a complex procedure.

According to the present invention, there is provided a process for producing a glass, comprising hydrolyzing a metal alkoxide in the presence of an organic solvent and an aqueous ammonia solution to obtain a sol solution; concentrating the sol solution to 1.00-1.95 times the volume of the metal alkoxide used; adding an acid catalyst to the resulting concentrate to allow the concentrate to gel; drying the resulting gel; and heating the dried gel to obtain a desired glass.

DETAILED DESCRIPTION OF THE INVENTION

The present invention is described in detail below.

The metal alkoxide used in the process of the present invention is preferably a silicon alkoxide. It is because the use of a silicon alkoxide can provide a silica glass. Examples of the silicon alkoxide include tetraalkoxysilanes such as tetramethoxysilane, tetraethoxysilane, tetra-n-propoxysilane, tetra-i-propoxysilane, tetra-n-butoxysilane, tetra-secbutoxysilane, tetra-tert-butoxysilane and the like; monoalkyltrialkoxysilanes, dialkyldialkoxysilanes and trialkylmonoalkoxysilanes obtained by substituting 1-3 alkoxy groups of the above tetraalkoxysilanes with alkyl groups; and their partial hydrolysates.

The metal alkoxide may be an aluminum alkoxide. Examples of the aluminum alkoxide include trialkoxyaluminums such as trimethoxyaluminum, triethoxyaluminum, tri-n-propoxyaluminum, tri-i-propoxyaluminum, tri-n-butoxyaluminum and the like; monoalkyldialkoxyaluminums and dialkylmonoalkoxyaluminums obtained by substituting 1-2 alkoxy groups of the above trialkoxyaluminums with alkyl groups; and their partial hydrolysates. As the metal alkoxide, there may further be used titanium alkoxides (e.g. tetrabutoxytitanium), zirconium alkoxides (e.g. tetraethoxyzirconium) and their partial hydrolysates.

It is of course that the above metal alkoxides can be used alone or in combination of two or more alkoxides of same or different metals.

In the process of the present invention, the metal alkoxide is hydrolyzed in the presence of an organic solvent and an aqueous ammonia solution. As the organic solvent, there can be used alcohols such as methanol, ethanol, propanol, butanol and the like; ethers such as propyl ether and the like; ketones such as acetone, propyl ketone and the like; and esters such as methyl formate, ethyl formate, methyl acetate, ethyl acetate and the like.

In the process of the present invention, the ratio of metal alkoxide, organic solvent and aqueous ammonia solution used varies depending upon the type of organic solvent used, etc.; however, when, for example, an alcohol is used as the organic solvent, the molar ratio of metal alkoxide, alcohol and aqueous ammonia solution is preferably 1 : 2-60 : 2-60, and the concentration of ammonia in the aqueous ammonia solution is preferably 0.0001-1 mol/1. Particularly preferably, the molar ratio is 1 : 3-20 : 2.5-10 and the ammonia concentration is 0.0005-0.1 mol/1.

In the process of the present invention, it is possible to add, as an optional component together with the essential components, a metal salt which is to be converted to a metal oxide or the like in the sol-gel glass production process to form a constituent of the glass produced. Typical examples of the metal salt include metal nitrates represented by the general formula $$M(NO_3)_m \tag{I}$$

(M is a metal and m is a coordination number of the metal M) and metal carboxylates represented by the general formula $$M(C_nH_{2n+1}COO)_m \tag{II}$$

(M is a metal, m is a cordination number of the metal M, and n is an integer of 1-6).

In the general formula (I) and (II), the metal component M is preferably metal elements which belong to the second to sixth periods of the groups Ia, IIa, IIIb, IVb, Vb, VIb, VIIb, VIII, Ib, IIb, IIIa, IVa and Va of the periodic table. Accordingly, as the metal component M, there can be specifically mentioned, for example, Al, Ba, Be, Bi, Cd, Ca, Ce, Cs, Cr, Co, Cu, Dy, Er, Eu, Gd, Ga, Au, In, Ir, Fe, La, Pb, Li, Mg, Mn, Hg, Nd, Ni, Pd, K, Pr, Ra, Rh, Rb, Sm, Sc, Ag, Na, Sr, Tl, Th, Sn, U, Yb, Y, Zn, Zr and Tb.

In the general formula (II), the carboxylic acid residue ($C_nH_{2n+1}COO$) is preferably those resides wherein n is 1–3, that is, an acetic acid residue ($CH_3COO$), a propionic acid residue ($C_2H_5COO$) and a butyric acid residue ($C_3H_7COO$) In the sol-gel glass production process, the metal nitrate of the general formula (I) decomposes to generate a gas (e.g. $NO_2$) and the metal carboxylate of the general formula (II) decomposes to generate a gas (e.g. $H_2O$, $CO_2$), both to be converted to a metal oxide and become a constituent of the glass produced.

The metal salt as an optional component may also be a metal chloride, a metal fluoride or the like.

The metal salt is preferably soluble in a mixed solution containing the metal alkoxide, organic solvent and aqueous ammonia solution, in order to obtain a uniform glass.

In the process of the present invention, the hydrolysis step is preferably effected at a temperature ranging from room temperature to the boiling point of the organic solvent or less. Usually, a temperature of room temperature to about 80° C. is selected. The time for the hydrolysis step is appropriately determined in a range of zero hour to 30 days. In this case, the zero hour means that no specific time is set for the hydrolysis step and that the hydrolysis may be effected in the subsequent concentration step. Since the hydrolysis can also be effected partially in the concentration step, the time for the hydrolysis step, when it is set, is determined to be as short as possible, particularly preferably 15 days or less.

In the process of the present invention, the sol solution obtained by the hydrolysis step is then concentrated. The present inventors found by an experiment that the concentration step for the sol solution is required to be effected until the volume of the sol solution is reduced to 1.00–1.95 times that of the metal alkoxide used. This point is explained in detail below.

Ten liters of a mixed solution consisting of 4 liters of a metal alkoxide (tetraethoxysilane), 4.8 liters of an organic solvent (ethanol) and 1.2 liters of an aqueous ammonia solution containing 0.0009 mol/l of ammonia was allowed to stand at 70° C. for 8 days to hydrolyze the metal alkoxide to obtain a sol solution; the sol solution was then concentrated to various concentrations; thereafter, there was observed the effect of the concentration degree on the gelation and drying treatments which were effected after the concentration. As a result, when the sol solution was concentrated to 4.2 liters (1.05 times the volume (4 liters) of the metal alkoxide used), 5.0 liters (1.25 times said volume) and 7.6 liters (1.90 times said volume), the gelation could be effected smoothly and any of the 10 dried gel samples obtained gave no cracks.

Meanwhile, when the sol solution was concentrated to 3.8 liters (0.95 times said volume), the addition of an acid catalyst such as hydrochloric acid, hydrosilicofluoric acid or the like caused the formation of a large number of giant particles. When the sol solution was concentrated to 8 liters (2.00 times said volume), all of the 10 dried gel samples obtained gave cracks. Also when no concentration was applied for the sol solution, all of the 10 dried gel samples obtained gave cracks.

It was confirmed from the above results that in the concentration step the sol solution is required to be concentrated to 1.00–1.95 times the volume of the metal alkoxide used.

As the means for concentration of the sol solution, there have conventionally been used an under-vacuum-heating concentration method using a rotary evaporator or the like, and a concentration method using an ultrafilter membrane. However, the former method has drawbacks, for example, in that the stability of the sol solution is reduced with the progress of the under-vacuum-heating concentration and the resulting gel adheres easily to the inner wall of the rotary evaporator; and the latter method has a drawback in that it uses a complex and expensive apparatus.

Hence, the present inventors sought a concentration means for the sol solution which is free from the above-mentioned drawbacks of the conventional concentration methods. That is, 10 liters of a mixed solution consisting of 4 liters of a metal alkoxide (tetraethoxysilane), 4.8 liters of an organic solvent (ethanol) and 1.2 liters of an aqueous ammonia solution (ammonium concentration: 0.0009 mol/l) was allowed to stand at 70° C. for 8 days to hydrolyze the metal alkoxide; the resulting sol solution (this solution is same as the solution used above to find out an appropriate concentration degree) was placed in a cylindrical polypropylene vessel of 20 cm in diameter and 35 cm in height; a cover with a circular hole of 10 cm in diameter was placed on the top of the vessel; the vessel with the cover was allowed to stand in a natural convection type oven at 70° C. for 25 hours, whereby the solution was concentrated from 10 liters to 9.8 liters. This volume decrease of 0.2 liter in the 25-hour concentration operation implies that concentration to, for example, 7.8 liters (1.95 times the volume of tetraethoxysilane used) requires a long period of time, i.e. about 10 days. Therefore, such a concentration method is apparently unsuitable for industrial use. Hence, the same sol solution as used above was placed in the same vessel as used above and allowed to stand in a hot air circulating oven under the same conditions (70° C.×25 hours), whereby the solution was concentrated from 10 liters to 6.7 liters (1.68 times the volume of tetraethoxysilane used). At that time, there was no adhesion of fine particles or gel-like materials to the inner wall of the vessel.

As is clear from the above, heating alone of the sol solution in the vessel having thereon a cover with a hole gave very slow concentration, because it induced the vaporization of the organic solvent, etc. and the resulting vapor pressure increase above the solution; in contrast, the additional use of an air-blowing means made it possible to reduce the vapor pressure above the solution and thereby accelerate concentration.

The air-blowing means is not limited to the hot air circulating oven and can be other means as long as it can feed air above the sol solution to reduce the vapor pressure thereabove. As an example, a fan can be provided at the top of the vessel containing the sol solution.

In the concentration operation, the temperature of the sol solution is preferably in a range of room temperature to the boiling point of the organic solvent or less.

In the process of the present invention, the sol solution which has been concentrated, i.e. the concentrated sol solution is then subjected to gelation, drying and heating in this order to obtain a desired glass. The key operational points in the gelation, drying and heating steps are described below.

(i) Gelation is effected by adding an acid catalyst. As the acid catalyst, there is preferably used an aqueous solution of hydrofluoric acid or hydrosilicofluoric acid because the solution can easily control the gelation time. These aqueous solutions preferably have an acid concentration of 1–15%, preferably 3–10% and are preferably used in an amount of 1–20 ml, preferably 3–15 ml per 100 ml of the concentrated sol solution.

The gelation is effected in a mold having a desired shape corresponding to the shape of desired glass. As the mold shape, there are mentioned, for example, a box-shaped mold and a cylindrical mold.

(ii) Drying is effected by placing a cover with a small hole on the mold containing the gel obtained in the above step (i) and keeping the mold at a temperature ranging from room temperature to about 80° C. When room temperature is used, drying is preferably effected for 15–60 days by using a mold with a cover having a hole area ratio of 0.2–2.0%. When 60° C. is used, drying is preferably effected for 6–15 days by using a mold with a cover having a hole area ratio of 0.1–0.8%.

In drying, temperatures above 80° C. must not be employed because such temperatures allow the dried gel to have cracks irrespective of the hole area ratio used.

(iii) Heating is effected at a temperature ranging from 1,150° C. to the softening point of the resulting glass or less, whereby a desired glass is obtained ultimately.

The present invention is described in more detail below by way of Examples.

EXAMPLE 1

Four liters of tetraethoxysilane, 4.8 liters of ethyl alcohol and 1.2 liters of an aqueous ammonia solution containing 0.0009 mol/l of ammonia were mixed to obtain 10 liters of a mixed solution. This mixed solution was allowed to stand in a vessel with a cover at 65° C. for 8 days to hydrolyze tetraethoxysilane to obtain a sol solution. The sol solution was then placed in a cylindrical vessel of 20 cm in diameter and 35 cm in height, having a cover with a hole of 10 cm in diameter. The vessel was allowed to stand in a hot air (65° C.) circulating oven for 30 hours to concentrate the sol solution to 6.7 liters (1.67 times the volume of tetraethoxysilane used). At that time, there was no adhesion of any gel-like material or powder to the inner wall of the vessel at the interface of the sol solution and air.

Then, 3 liters of the concentrate obtained above was mixed with 0.2 liter of a 5% aqueous hydrosilicofluoric acid solution. The mixture was placed in a box-shaped mold of 35 cm in each side and allowed to stand at room temperature for about 30 minutes to give rise to gelation.

The resulting gel was allowed to stand at room temperature for 40 days in the same box-shaped mold by placing thereon a cover having a hole of a hole area ratio of 0.8%, and thereby dried to obtain a dried gel having no crack. When the drying temperature was changed to 60° C., the drying period could be shortened to 15 days at a hole area ratio of 0.25%.

The resulting dried gel was heated from room temperature to 1,200° C. in 50 hours and kept at that temperature for 2 hours to obtain a large-sized square transparent glass of 150 mm × 150 mm × 7 mm.

The specific gravity, thermal expansion coefficient, Vickers hardness, infrared absorption spectrum and refractive index of the glass were same as those of conventional silica glass.

COMPARATIVE EXAMPLE 1

The same procedure as in Example 1 was repeated except that the concentration step of the sol solution was omitted. It was impossible to obtain a dried gel with no crack.

Further, the same procedure as in Example 1 was repeated except that the sol solution was concentrated to 9 liters (2.25 times the volume of tetraethoxysilane used). In this case, either, it was impossible to obtain a dried gel with no crack.

Furthermore, the same procedure as in Example 1 was repeated except that the sol solution was concentrated to 3.8 liters (0.95 times the volume of tetraethoxysilane used). In this case, the addition of hydrosilicofluoric acid at the gelation step generated a large number of giant particles.

EXAMPLE 2

The same procedure as in Example 1 was repeated except that the sol solution was concentrated to 7.6 liters (1.90 times the volume of tetraethoxysilane used). The same results as in Example 1 were obtained.

EXAMPLE 3

The same procedure as in Example 1 was repeated except that the sol solution was concentrated to 4.2 liters (1.05 times the volume of tetraethoxysilane used) and the gel was dried for 30 days. The same results as in Example 1 were obtained.

EXAMPLE 4

The same procedure as in Example 1 repeated except that the sol solution of Example 1 was mixed with 10 ml of aluminum propoxide. A transparent glass was obtained similarly

EXAMPLE 5

The same procedure as in Example 1 was repeated except that the sol solution of Example 1 was mixed with 3 g of neodymium nitrate. A transparent glass doped with neodymium was obtained similarly to Example 1.

EXAMPLE 6

A dried gel was obtained by 45 days of drying in the same manner as in Example 1 except that the box-shaped mold used in Example 1 was replaced by a cylindrical mold, the hole area ratio of the cover was 1.6%, the gelation temperature was 50° C., and the cylindrical mold was laid on its side during drying. The dried gel was then heated in the same manner as in Example 1 to obtain a rod-shaped transparent glass of 2 cm$\phi$ × 5 cm. The properties of the glass were same as those of conventional silica glass.

EXAMPLE 7

The same procedure as in Example 1 was repeated except that the 5% aqueous hydrosilicofluoric acid solution was replaced by a 4.6% aqueous hydrofluoric acid solution. The same results as in Example 1 were obtained.

EXAMPLE 8

One liter of tetraethoxysilane, 2.5 liters of ethanol and 0.33 liter of an aqueous ammonia solution containing 0.015 mol/l of ammonia were mixed to obtain 3.83 liters of a mixed solution. The mixed solution was allowed to stand at 70° C. for 3 days to hydrolyze tetraethoxysilane. The resulting sol solution was concentrated to 1.90 liters (1.90 times the volume of tetraethoxysilane used), 1.63 liters (1.63 times said volume) or 1.05 liters (1.05 times said volume) to obtain three concentrated sol solutions. Each of these solutions was subjected to the same procedure as in Example 1 to obtain the same results as in Example 1.

COMPARATIVE EXAMPLE 2

The same sol solution before concentration as in Example 8, and the two concentrated sol solutions obtained by concentrating said sol solution to 2.2 liters (2.2 times the volume of tetraethoxysilane used) and 0.95 liters (0.95 times said volume) were subjected to the same procedure (gelation, drying and heating) as in Example 1. In each case of glass production, cracks appeared in the dried gel formation step.

As described above, in the process of the present invention, the sol solution obtained by hydrolysis is concentrated to 1.00 to 1.95 times the volume of the metal alkoxide used; as a result, the dried gel obtained by the subsequent gelation and drying has no cracks and a large-sized glass can be obtained.

What is claimed is:

1. A process for producing a glass, comprising:
   (a) hydrolyzing a metal alkoxide selected from the group consisting of silicon, aluminum, titanium and zirconium in the presence of an organic solvent and an aqueous ammonia solution to obtain a sol solution,
   (b) concentrating the sol solution to 1.00–1.95 times the volume of the metal alkoxide used,
   (c) adding a hydrofluoric or hydrosilicofluoric acid catalyst to the resulting concentrate to allow the concentrate to gel,
   (d) drying the resulting gel, and
   (e) heating the dried gel to obtain the desired glass.

2. A process according to claim 1, wherein a metal salt is used together with the metal alkozide.

3. A process according to claim 1, wherein the concentration is effected by heating the sol solution to be concentrated while feeding air above the surface of the sol solution.

4. A process according to claim 3, wherein the concentration is effected in a hot air circulating oven.

* * * * *